Nov. 1, 1949    F. S. ELLIOTT    2,486,932
FLOWER HOLDER
Filed July 10, 1948
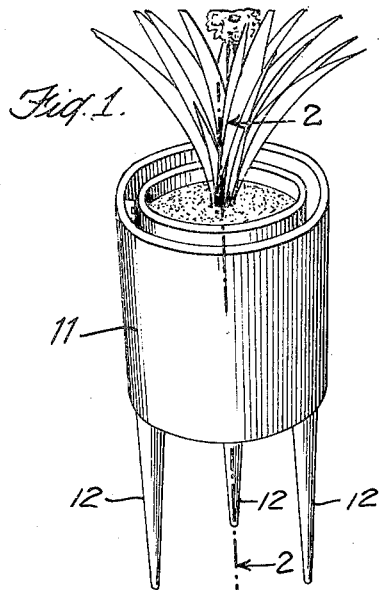
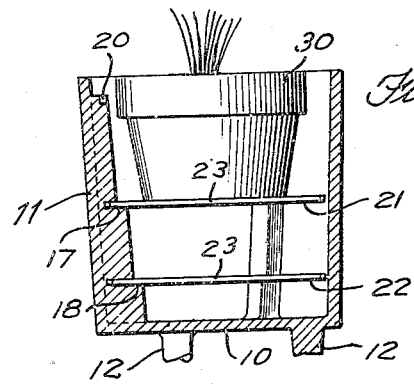
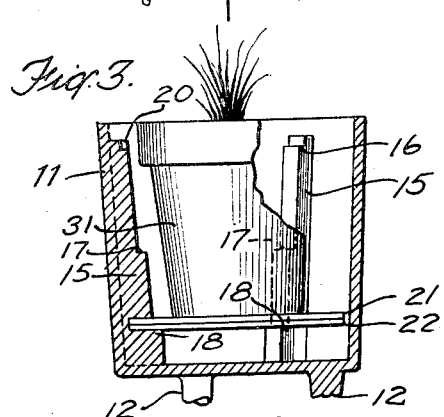
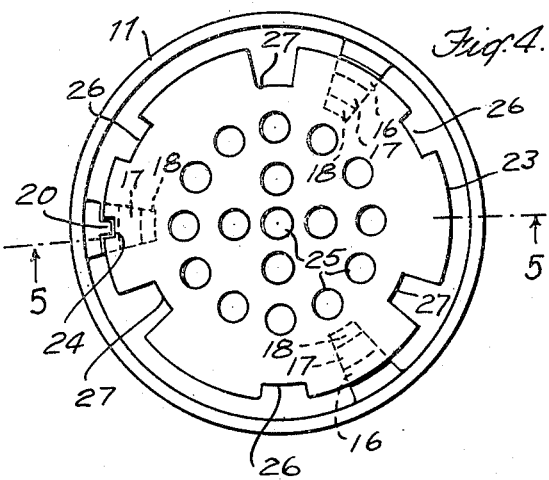
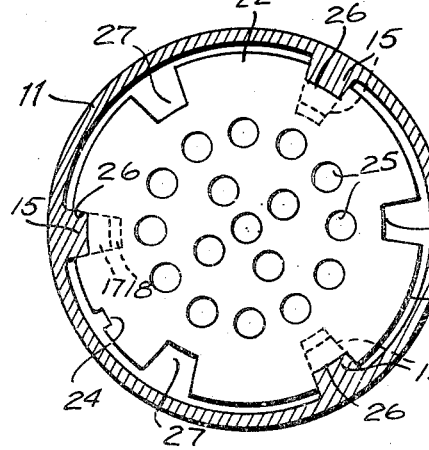
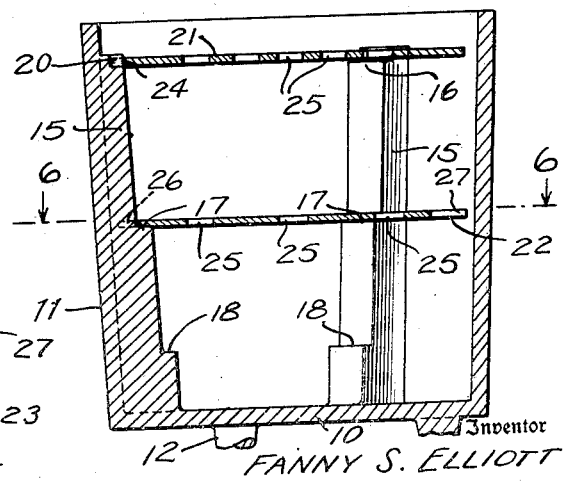
Inventor
FANNY S. ELLIOTT
Attorney Patented Nov. 1, 1949

2,486,932

UNITED STATES PATENT OFFICE 2,486,932

FLOWER HOLDER

Fanny Sellors Elliott, Greenwich, Conn.

Application July 10, 1948, Serial No. 38,002

3 Claims. (Cl. 47—41)

This invention relates to a flower holder and more particularly to a holder for potted flowers or cut flowers for outdoor use, as in a cemetery, although the holder is not restricted to this use.

An object of the invention is to provide a holder of the above type having members which may be adjusted to receive flower pots of different sizes or to receive the stems of cut flowers.

Another object is to provide a device of the above type which is simple and economical to manufacture.

Another object is to provide a device of the above type having a support in the shape of a perforated disc which may be adjusted to various heights for the above purpose.

Various other objects and advantages will be apparent as the nature of the invention is more fully disclosed.

The novel features which are characteristic of this invention will be better understood by referring to the following description, taken in connection with the accompanying drawings in which a specific embodiment thereof has been set forth for purposes of illustration.

In the drawings:

Fig. 1 is a perspective view of a holder embodying the present invention, showing a potted flower therein;

Fig. 2 is a vertical section through the holder of Fig. 1;

Fig. 3 is a similar vertical section showing the holder adjusted to receive a larger flower pot;

Fig. 4 is a top plan view of the holder with the upper disc positioned to receive the stems of cut flowers;

Fig. 5 is a vertical section taken on the line 5—5 of Fig. 4; and

Fig. 6 is a horizontal section taken on the line 6—6 of Fig. 5.

Referring to the drawings more in detail, the holder is shown as comprising an open top container in the form of a casting having a bottom wall 10 and a cylindrical side wall 11. The container is also provided with depending prongs 12 which are adapted to be pressed into the ground for securing the container in place. If the container is to be used indoors the prongs 12 may be omitted.

The inner wall of the container is formed with a plurality of peripherally spaced inwardly extending vertical flanges 15 which are shown as three in number although four or more may be used if desired. Each flange 15 is provided with an upper shoulder 16, an intermediate shoulder 17, and a bottom shoulder 18 which project inwardly and are respectively progressively offset toward the center of the container to form ledges for supporting the discs to be described. The upper shoulder 16 of one of the flanges 15 is provided with a central boss 20 for positioning the disc when in upper position.

A pair of supporting discs 21 and 22 are provided which are similar in construction and are of a diameter such that their peripheral edges 23 rest upon the upper shoulders 16 of the various flanges 15 as shown in Figs. 4 and 5. The peripheral edge 23 is provided with a notch 24 which registers with the boss 20 above described for securing the disc against rotation and properly positioning the same. Each disc is provided with a plurality of holes 25 which are variously disposed over the surface thereof and are adapted to receive the stems of cut flowers. The holes 25 are preferably formed in a pattrn which is repeated every 30° in the embodiment shown so that the holes in the upper and lower discs 21 and 22 remain in registration when the upper disc 21 is rotated 30° in either direction from the position shown in Fig. 4.

The disc 21 is also provided with a plurality of notches 26 which are peripherally spaced in accordance with the spacing of the flanges 15 of the container and in the embodiment shown are offset 30° in a clockwise direction from the notch 24. The disc is also provided with a plurality of notches 27 which are likewise peripherally spaced in accordance with the spacing of the flanges 15 and in the form shown are displaced from the notch 24 by 30° in a counterclockwise direction. The notches 26 are of the proper radial depth to seat on the shoulders 17 of the flanges 15 and the notches 27 are of the proper radial depth to seat on the shoulders 18 of the flanges 15. Hence the disc 21 may be positioned on the shoulders 16, as shown in Fig. 5, by bringing the notch 24 into registration with the boss 20. If the disc 21 is rotated 30° in a counterclockwise direction to bring the notches 26 into registration with the flanges 15, the disc may be seated on the shoulders 17, as indicated in Fig. 2. If, on the other hand, the disc 21 is rotated 30° in a clockwise direction from the position shown in Fig. 4, the notches 27 are brought into registration with the flanges 15 and the disc is brought to rest on the shoulders 18, as indicated in Fig. 3.

In the use of this device two discs 21 and 22 are commonly employed. If the holder is to be used for cut flowers, the upper disc 21 is seated on the upper shoulders 16 and the lower disc 22 is seated on the intermediate shoulders 17 as indicated in Fig. 5, or on the lower shoulders 18 according to the length of the stems. The stems of cut flowers may then be disposed between the registering holes 25 in the upper and lower discs and arranged in the usual manner. If, on the other hand, the holder is used for a small flower pot, the disc 21 may be seated on the intermediate shoulders 17, as indicated in Fig. 2, to support a small pot 30 in registration with the top of the container. The lower disc may be positioned on the lower shoulders 18 so as not to interfere with the upper disc. If the holder is to be used for a large pot 31, the upper disc may be brought to rest upon the lower disc 22 which is supported by the shoulders 18, as shown in Fig. 3. The device is accordingly of general utility for supporting cut flowers and flower pots and may be used either indoors or outdoors for various purposes as will be readily understood.

Various changes and adaptations may be made by a person skilled in the art without departing from the scope of the present invention.

What is claimed is:

1. An open top container having peripherally spaced inwardly extending vertical flanges provided with supporting shoulders at upper, lower and intermediate positions, a pair of flat discs having aligned holes to receive the stems of cut flowers and having peripherally spaced notches of a radial extent suited to receive the portions of said flanges above the respective shoulders, said upper and lower shoulders being spaced to support said discs in positions to receive the stems of cut flowers, said intermediate shoulders being disposed to carry a disc in position to support a small flower pot and said lower shoulder being disposed to carry a disc in position to support a large flower pot.

2. A flower holder, comprising an open top container having side walls, a plurality of inwardly extending vertical flanges formed on said side walls having shoulders at different elevations, said shoulders, from top to bottom, being progressively offset toward the center of said container by different amounts, and a disc having a peripheral edge shaped to seat on the upper shoulders of said flanges and of a diameter to fit within said side walls at the bottom of said container, said disc having peripherally spaced notches arranged in sets to register with said flanges, the notches of each set having a radial depth suited to receive the portions of said flanges above a selected set of said shoulders, whereby said disc may be adjusted to rest on the different sets of shoulders.

3. A flower holder comprising an open top container having side walls, a plurality of inwardly extending vertical flanges formed on said side walls having shoulders at different elevations, said shoulders, from top to bottom, being progressively offset toward the center of said container by different amounts and a disc having holes to receive the stems of cut flowers and having a peripheral edge shaped to seat on the upper shoulders of said flanges, said disc having peripherally spaced notches arranged in sets to register with said flanges, the notches of each set having a radial depth suited to receive the portions of said flanges above a selected set of said shoulders, whereby said disc may be adjusted to rest on the different sets of shoulders.

FANNY SELLORS ELLIOTT.

REFERENCES CITED

The following references are of record in the file of this patent:

UNITED STATES PATENTS

| Number | Name | Date |
| --- | --- | --- |
| 1,462,947 | Stuck | July 23, 1923 |
| 1,977,417 | Winger | Oct. 16, 1934 |

FOREIGN PATENTS

| Number | Country | Date |
| --- | --- | --- |
| 845,789 | France | May 22, 1939 |